US007428583B1

(12) United States Patent
Lortz et al.

(10) Patent No.: US 7,428,583 B1
(45) Date of Patent: Sep. 23, 2008

(54) NETWORK POLICY DISTRIBUTION

(75) Inventors: Victor B. Lortz, Hillsboro, OR (US); Ylian Saint-Hilaire, Hillsboro, OR (US); James L. Jason, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1163 days.

(21) Appl. No.: 09/704,384

(22) Filed: Oct. 31, 2000

(51) Int. Cl.
*G06F 15/173* (2006.01)
*G06F 15/16* (2006.01)
*G06F 15/177* (2006.01)
(52) U.S. Cl. .................... 709/223; 709/221; 709/246
(58) Field of Classification Search ............... 709/221, 709/222, 223, 224; 715/513, 531
See application file for complete search history.

(56) References Cited

U.S. PATENT DOCUMENTS

| 5,872,928 | A | * | 2/1999 | Lewis et al. ............... 709/222 |
| 5,889,953 | A | * | 3/1999 | Thebaut et al. ............ 709/221 |
| 6,006,242 | A | * | 12/1999 | Poole et al. ............... 715/531 |
| 6,023,714 | A | * | 2/2000 | Hill et al. ................. 715/513 |
| 6,393,474 | B1 | * | 5/2002 | Eichert et al. ............. 709/223 |
| 6,397,232 | B1 | * | 5/2002 | Cheng-Hung et al. ...... 715/203 |
| 6,408,326 | B1 | * | 6/2002 | Larsson et al. ............ 709/201 |
| 6,585,778 | B1 | * | 7/2003 | Hind et al. ................ 715/513 |
| 6,772,413 | B2 | * | 8/2004 | Kuznetsov ................ 709/231 |
| 6,792,577 | B1 | * | 9/2004 | Kimoto .................... 715/522 |
| 6,816,871 | B2 | * | 11/2004 | Lee ....................... 707/104.1 |
| 6,839,766 | B1 | * | 1/2005 | Parnafes et al. ........... 709/232 |
| 6,880,005 | B1 | * | 4/2005 | Bell et al. ................. 709/225 |
| 6,931,532 | B1 | * | 8/2005 | Davis et al. ............... 713/167 |
| 7,159,125 | B2 | * | 1/2007 | Beadles et al. ............ 713/193 |

* cited by examiner

*Primary Examiner*—Kevin Bates
(74) *Attorney, Agent, or Firm*—Fish & Richardson P.C.

(57) ABSTRACT

A method includes receiving a specification for translating a network policy from a first schema to a second, different schema and translating the network policy into the second different schema based on the specification. A network system is configured based on the translated policy.

33 Claims, 10 Drawing Sheets

// Policy that conforms to the newer schema (specifies Rjindael):

<?xml version="1.0"?>

<!DOCTYPE IPsecPolicyOnSystem PUBLIC "//somestandard.org/IPsecPolicy/Version1.1"> ~34

<IPsecPolicyOnSystem timestamp="2000-9-30_12:12:12"> ~35

<IKEProposals>
  90a ~<IKEProposal id="Proposal1" CipherAlgorithm="DES" HashAlgorithm="MD5" GroupId="DH768" AuthenticationMethod="Preshared"/>
  90b ~<IKEProposal id="Proposal2" CipherAlgorithm="Rjindael" HashAlgorithm="SHA-1" GroupId="DH1024" AuthenticationMethod="DSS_Signatures"/>
</IKEProposals>

</IPsecPolicyOnSystem>

FIG. 2

```
// DTD schema Version 1.1 for IPsec implementations that support the new
// encryption algorithm called Rjindael:

<?xml version="1.0" encoding="UTF-16"?>

<!ELEMENT IKEProposal EMPTY>

<!ATTLIST IKEProposal
    102~ id ID #REQUIRED                                                              ~104
    108~ CipherAlgorithm (3DES | DES | IDEA | Blowfish | RC5 | CAST | Rjindael) #REQUIRED    ⎫
    114~ HashAlgorithm (MD5 | SHA-1 | Tiger) #REQUIRED                                       ⎬ 110
                       120                                                                   ⎪
    116~ GroupId (DH768 | DH1024 | DH1536 | ECC2N155 | ECC2N155 | ECC2N185) #REQUIRED        ⎪
                                                       122                                   ⎪
    118{ AuthenticationMethod (DSS_Signatures | Preshared | RSA_Signatures |                 ⎬ 124
         RSA_Encryption | Revised_RSA_Encryption | Kerberos) #REQUIRED                       ⎭
>

<!ELEMENT IKEProposals (IKEProposal+)>

<!ELEMENT IPsecPolicyOnSystem (IKEProposals)>

<!ATTLIST IpsecPolicyOnSystem
    timestamp CDATA #REQUIRED ~126
>
```

FIG. 3

```
// DTD schema for version 1.0 IPsec policy implementations (doesn't
// include the new encryption algorithm called Rjindael):

<?xml version="1.0" encoding="UTF-16"?>

<!ELEMENT IKEProposal EMPTY>

<!ATTLIST IKEProposal
    id ID #REQUIRED
    CipherAlgorithm (3DES | DES | IDEA | Blowfish | RC5 | CAST) #REQUIRED
    HashAlgorithm (MD5 | SHA-1 | Tiger) #REQUIRED
    GroupId (DH768 | DH1024 | DH1536 | ECC2N155 | ECC2N185) #REQUIRED
    AuthenticationMethod (DSS_Signatures | Preshared | RSA_Signatures |
    RSA_Encryption | Revised_RSA_Encryption | Kerberos) #Required
>

<!ELEMENT IKEProposals (IKEProposal+)>

<!ELEMENT IPsecPolicyOnSystem (IKEProposals)>

<!ATTLIST IPsecPolicyOnSystem
    timestamp CDATA #REQUIRED
>
```

// XSLT file to transform the above policy into a policy conforming to the older
// schema. This transformation simply replaces attribute "Rjindael" with "3DES".

```
<?xml version="1.0" encoding="UTF-8"?>
<!-- This stylesheet replaces the CipherAlgorithm Rjindael with 3DES, for IKE
implementations that do not support Rjindael. -->
<xsl:stylesheet version="1.0" xmlns:xsl="http://www.w3.org/1999/XSL/Transform">
     <xsl:output method="xml" version="1.0" encoding="UTF-8" indent="yes"/>

<xsl:output doctype-public-"//somestandard.org/IPsecPolicy/Version1.0"/>   ⟵ 146

<xsl:template match="/*">
     <xsl:element name="IPsecPolicyOnSystem">
     <xsl:copy-of select="@*"/>
     <xsl:element name="IKEProposals">
     <xsl:apply-templates select="IKEProposals"/>
     </xsl:element>
     </xsl:element>
     </xsl:template>

<xsl:template match="IKEProposals/IKEProposal">

<xsl:element name="IKEProposal">
               <xsl:copy-of select="@*"/>
               <xsl:if test="@CipherAlgorithm = 'Rjindael'">   ⟵ 142a
                    <xsl:attribute name="CipherAlgorithm">3DES</xsl:attribute>  ⟵ 142b
               </xsl:if>

</xsl:element>

</xsl:template>

</xsl:stylesheet>
```

(142 braces around the middle block)

FIG. 5A

// Output resulting from applying the above transformation to the policy:

<?xml version="1.0" encoding="utf-8"?>

<!DOCTYPE IPsecPolicyOnSystem PUBLIC "//somestandard.org/IPsecPolicy/Version1.0"> ⟵ 150

<IPsecPolicyOnSystem timestamp="2000-9-30_12:12:12"> ⟵ 35

<IKEProposals> ⟵ 160

<IKEProposal id="Proposal1" CipherAlgorithm="DES" HashAlgorithm="MD5" GroupId="DH768" AuthenticationMethod="Preshared"/>

<IKEProposal id="Proposal2" CipherAlgorithm="3DES" HashAlgorithm="SHA-1" GroupId="DH1024" AuthenticationMethod="DSS_Signatures"/>

</IKEProposals>

</IPsecPolicyOnSystem>

NETWORK POLICY DISTRIBUTION

TECHNICAL FIELD

This invention relates to network policy distribution.

BACKGROUND

For two computers to communicate with each other over a network, the network systems on the two computers typically are configured so that they are compatible. For example, if two computers are to encrypt data communicated between them, both computers may use the same encryption and decryption methods. For small networks with simple computers, an operator may manually configure the network systems at each of the computers.

Alternatively, a policy server computer on the network may configure the network systems of the computers on the network. The network configuration data for the computers are stored in policy files or in a policy database on the policy server. The policy server configures the network systems of the computers by transmitting configuration data from the policy files or database to the computers. Policy clients on the computers may then change the network configuration of the computers using the transmitted configuration data.

For a policy client to configure a network system using a policy file, the policy file is typically formatted in a particular way. The rules for formatting a policy file are referred to as a schema. Different clients may require different policy files formatted according to different schemas.

DETAILED DESCRIPTION

Figure 1A:
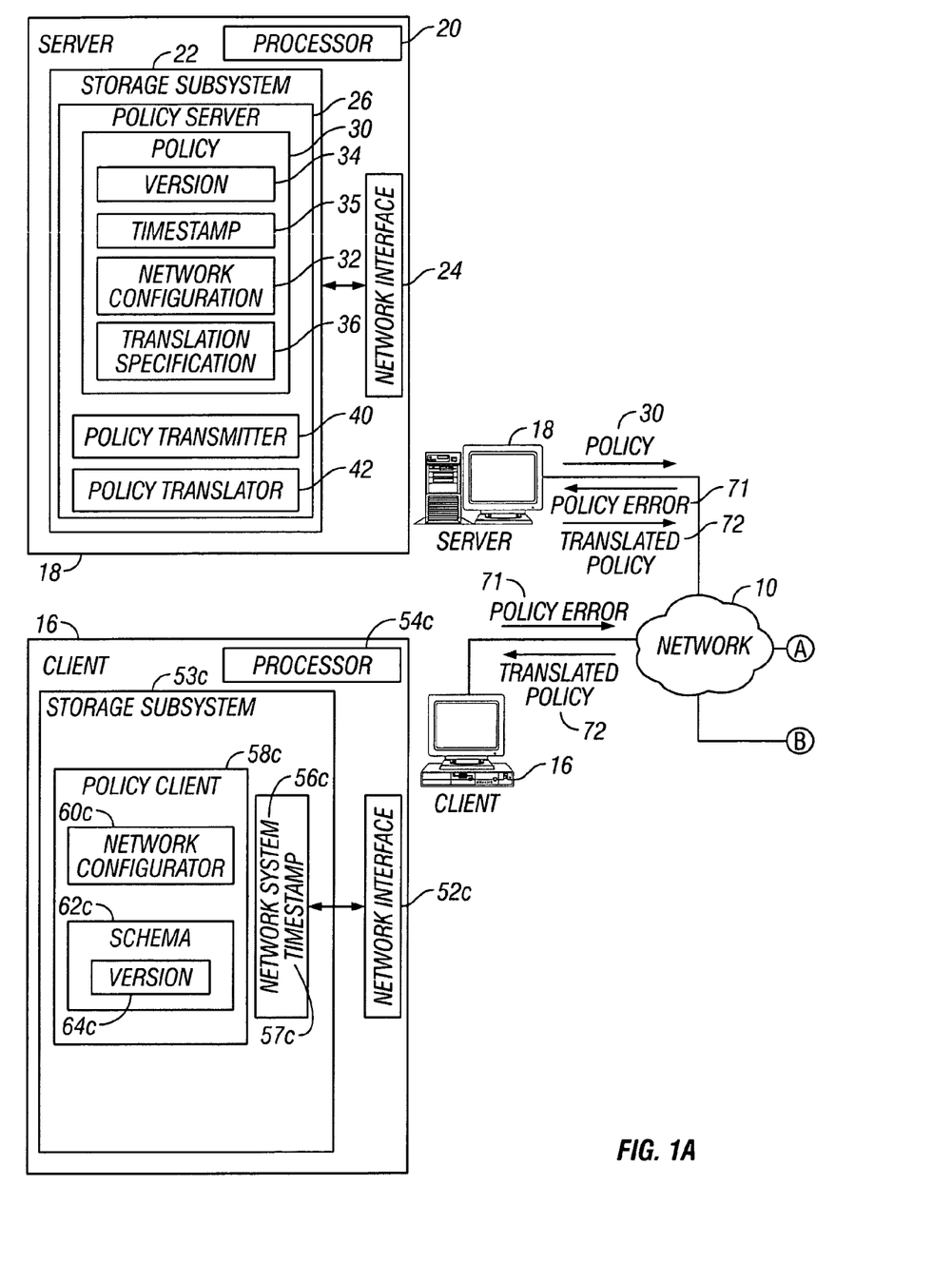
FIGS. 1A-1B are a block diagram of a network of computers according to the invention.
Figure 1B:
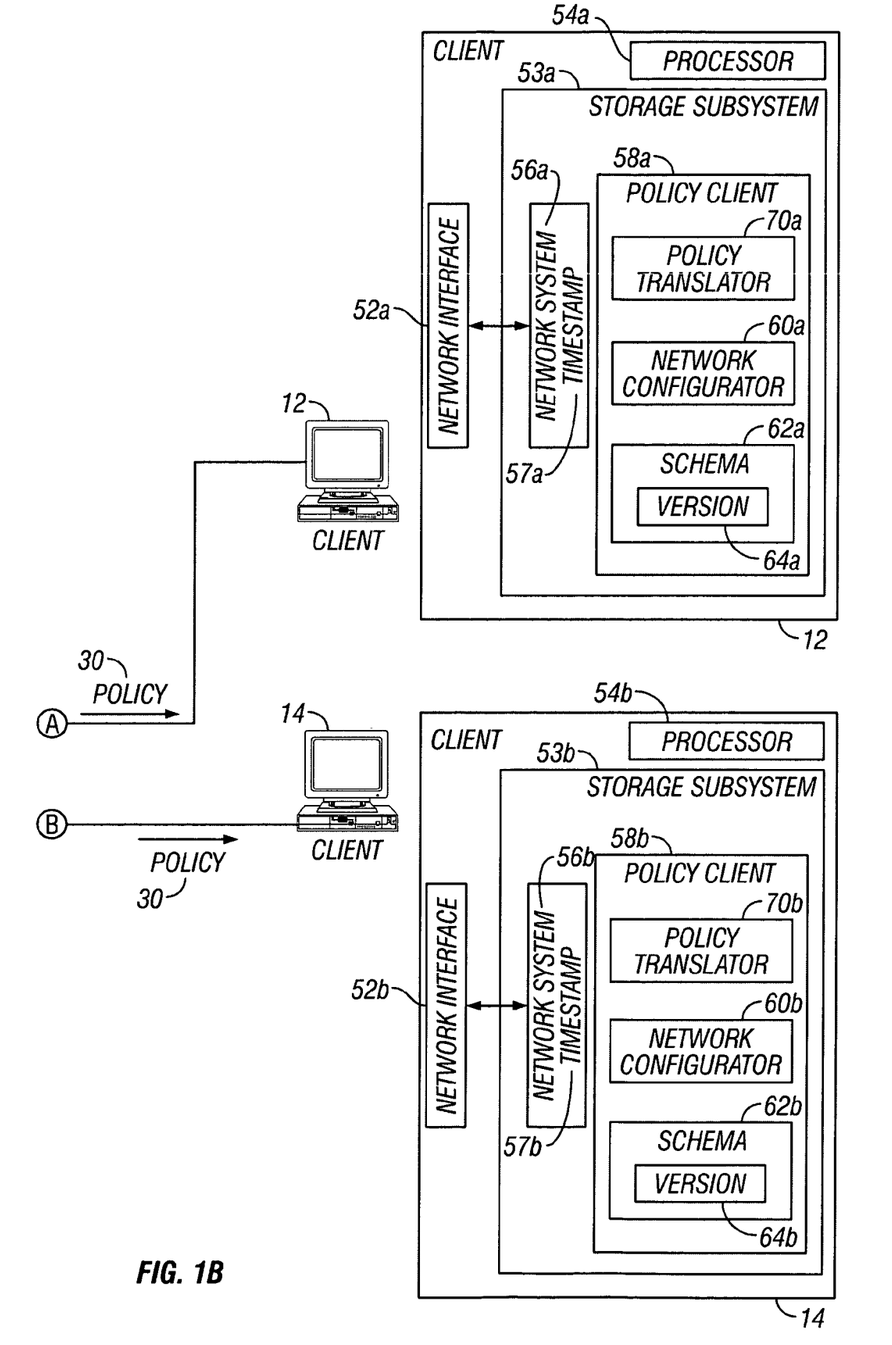

As shown in FIG. 1, a network 10 connects client computers 12, 14, 16 to a server 18. The server 18 has a processor 20 for executing computer programs, a network interface 24 for communicating over the network 10, and a storage subsystem 22. Storage subsystem 22 may include a CDROM drive, floppy disk, hard disk, hard disk array, memory, and so on. Processor 20 may cause the network clients 12-16 to change their network configurations by executing policy server 26 software, stored within storage subsystem 22.

Policy server software 26 is associated with a network policy 30, which includes a particular version 34 of a network configuration 32 and a timestamp 35 indicating the time that the network configuration 32 was created. The network configuration 32 is used to configure the clients 12, 14, 16. The clients 12, 14, 16 may differ from each other, for example, because they are from different manufacturers or have different operating systems. Consequently the clients may require different versions of the network configuration 32. The policy 30 includes a specification 36 for translating the network configuration 32 from the particular version 34 to another version of the policy that may be required by the clients 12, 14, 16. The policy 30 may contain multiple translation specifications 36 to allow the policy to be translated into many different versions.

The policy server software 26 also includes a policy transmitter 40 that transmits the policy 30 over the network 10 to the client computers 12, 14, 16 and a policy translator 42 that can be used to translate the network configuration 32 using the translation specification 36 for client computers 16 that cannot do the translation.

The client computers 12, 14, 16 each contain a network interface 52a, 52b, 52c for communicating with the network 10, a storage subsystem 53a, 53b, 53c, and a processor 54a, 54b, 54c for executing software stored within the storage subsystem. The software sends and receives data over the network through a network system 56a, 56b, 56c and the network interface 52a, 52b, 52c. Policy client software 58a, 58b, 58c, stored within the storage subsystem 53a, 53b, 53c configures the network system 56a, 56b, 56c using the network policy 30 transmitted by the server 18.

Policy client software 58a, 58b, 58c includes a network configurator 60a, 60b, 60c that receives the policy 30 from the server 18 and uses the policy 30 to configure the network system 56a, 56b, 56c. Network configurator 60a, 60b, 60c also records a timestamp 57a, 57b, 57c associated with the network policy 30 that was used to configure the network system 56a, 56b, 56c in the network system. Each network configurator 60a, 60b, 60c is associated with a particular "schema," 62a, 62b, 62c of the network configuration 32. A network configurator may not be able to configure a network interface with a policy file that is configured according to a different schema from the one that is expected by the network configurator. The schemas 62a, 62b, 62c of the network clients are assigned version numbers 64a, 64b, 64c to distinguish one schema from another.

Clients 12, 14 have a policy translator 70a, 70b, which uses the translation specification 36 contained within the policy 30 to translate the network configuration 32 contained within the policy 30 to the version 64a of the schema 62a, 62b associated with the client 12, 14. The network configurator 60a, 60b then configures the network system 56a, 56b using the translated policy. Thus, sending the translation specification 36 to the clients 12, 14 along with the network configuration allows the same policy 30 to be used in configuring clients that may have different policy versions. Since only one policy 30 is maintained on the server, the amount of effort and resources needed to maintain the policy 30 is reduced. Traffic within the network 10 may also be reduced by broadcasting the policy 30 to both clients 12, 14 in the same transmission.

Client 16 is not equipped with a policy translator. If the policy 30 does not have the same version 64c as client 16, client 16 sends a policy error 71 to the server 18. The policy translator 42 on the server 18 then translates the policy 30 into the version 64c associated with the client 16 and transmits the translated policy 72 to the client 16. The network configurator 60c of the client 16 uses the translated policy 72 to configure the network system 56c. Thus the policy 30 can be used with a client 16 that is not equipped to translate the policy.

The policy 30 may, for example, be represented in a tag-based language such as the eXtensible Markup Language (XML), HyperText Markup Language (HTML), or Standard Generalized Markup Language (SGML). The invention will be described with reference to an implementation where the policy is represented as an XML file with the translation specification being represented in an eXtensible Stylesheet Language (XSL) file. The policy translators 40, 70a, 70b are eXtensible Stylesheet language translators (XSLT). XML and XSL are document formatting and translating languages promulgated by the World Wide Web Consortium (W3C). XSL translators are easily available because XSL is used in many different applications. For example, the XSL translator included in Internet Explorer by Microsoft Inc. may be used as a policy translator 40, 70a, 70b.

Figure 2:
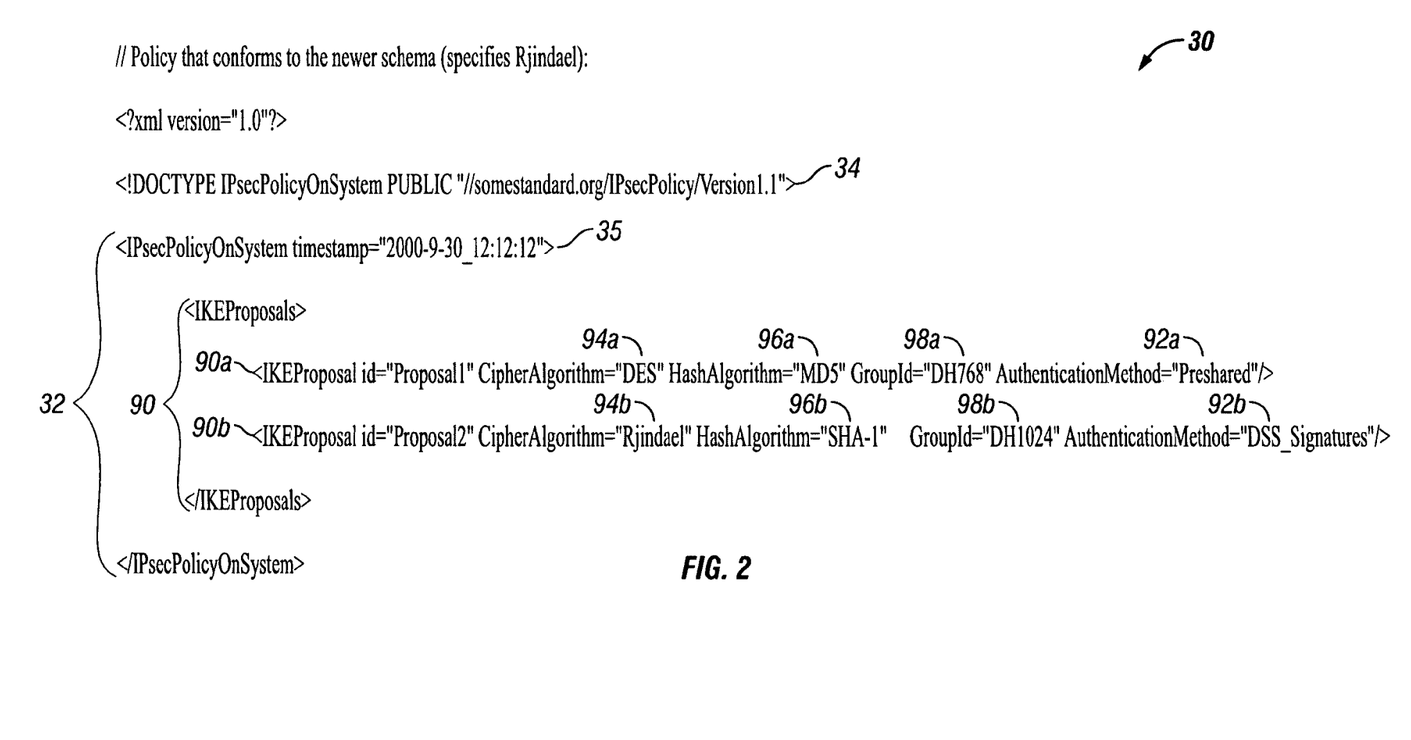
FIG. 2 shows a first part of a network policy according to a first version.

As shown in FIG. 2, a network policy 30 specifies the version 34 of a schema to which the policy 30 conforms and a timestamp 35 indicating the creation time of the policy. Policy 30 conforms to a schema version 1.1. Policy 30 has network configuration data 32 for configuring network systems 56a, 56b, 56c (FIG. 1) of client computers. Network configuration data 32 includes network data encryption settings 90 that network systems 56a, 56b, 56c (FIG. 1) may use when communicating with another computer. The network systems 56a, 56b, 56c of a client computer 12, 14, 16 configured according to the policy 30 proposes a first network setting 90a as an encryption setting for communication between the client computer 12, 14, 16 and another computer. If the first setting 90a is unacceptable to the other computer, the network system 56a, 56b, 56c propose a second setting 90b to the other computer. The first setting 90a proposes a pre-shared 92a authentication method with a DES 94a cipher algorithm, an MD5 hash algorithm 96a and a group identity 98a of DH768. The second setting 90b proposes a "DSS signatures" 92b authentication method with a "Rjindael" 94b cipher algorithm, an SHA-1 hash algorithm 96b and a group identity 98b of DH1024.

Figure 3:
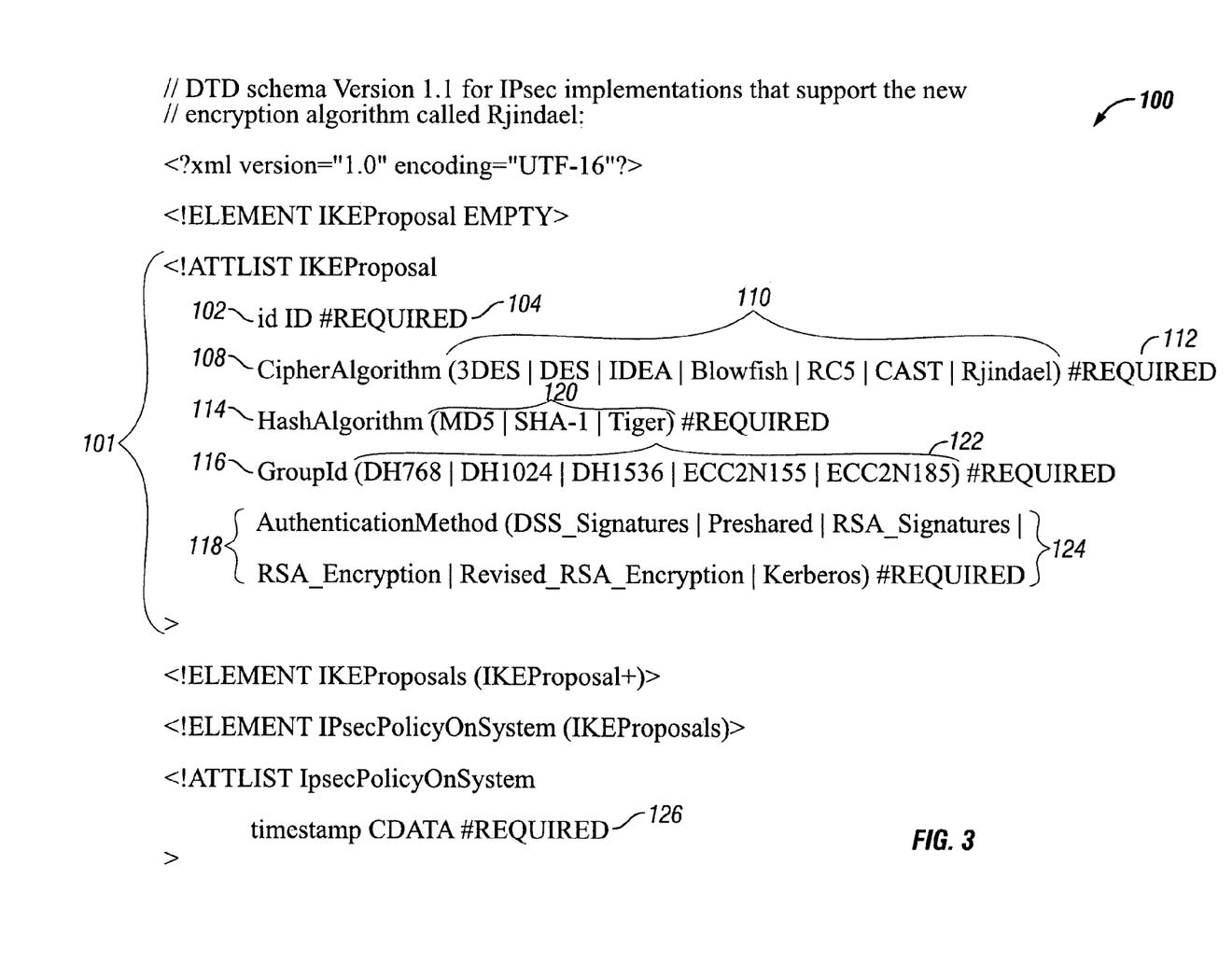
FIG. 3 shows a schema of the first version of the network policy.

As shown in FIG. 3, the schema 100 for the policy 30 (FIG. 2) lists the requirements 101 for the attributes of a network-setting proposal in the policy 30. According to the schema, an ID 102 is required 104 for each proposal. A cipher algorithm 108 selected from "3DES," "DES," "IDEA," "Blowfish," "RC5," ""CAST," and "Rjindael"" 110 is also required. A hash algorithm 114, a Group ID 116, and an authentication method 118 respectively selected from lists 120, 122, and 124 are also required in the network setting proposal. Schema 100 specifies an arrangement of a version "1.1" policy file that can be used by the network configurator 60a, 60b, 60c. A network configurator may not be able to configure a network system with a policy file that does not conform to the schema of the network configurator.

Figure 4:
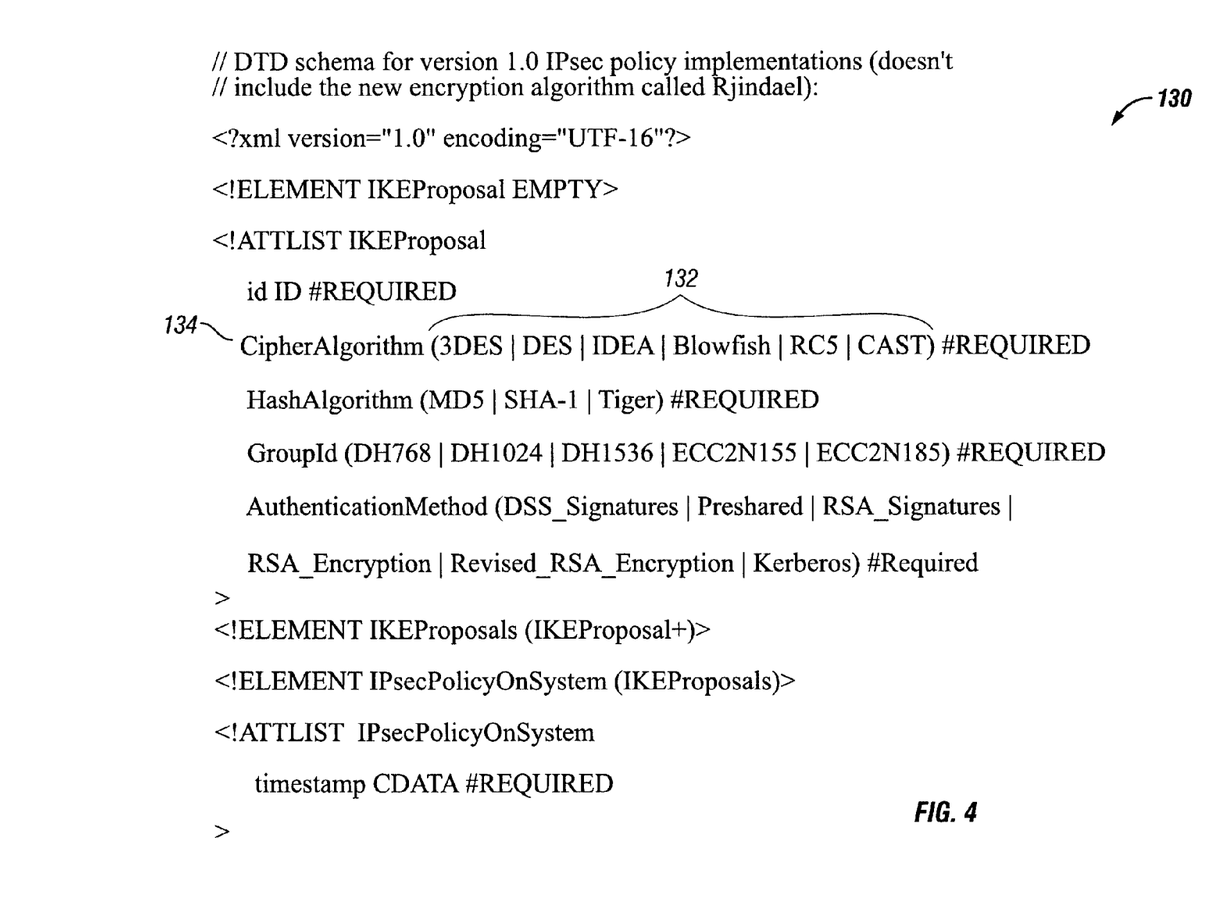
FIG. 4 shows a schema of a second version of a network policy.

As shown in FIG. 4, an older schema 130 associated with version "1.0" network policies does not include the "Rjindael" algorithm 94b of policy 30 (FIG. 2) in the list 132 of cipher algorithms 134. Consequently, a network configurator associated with the older schema 130 cannot configure a network system using policy 30.

Figure 5A:
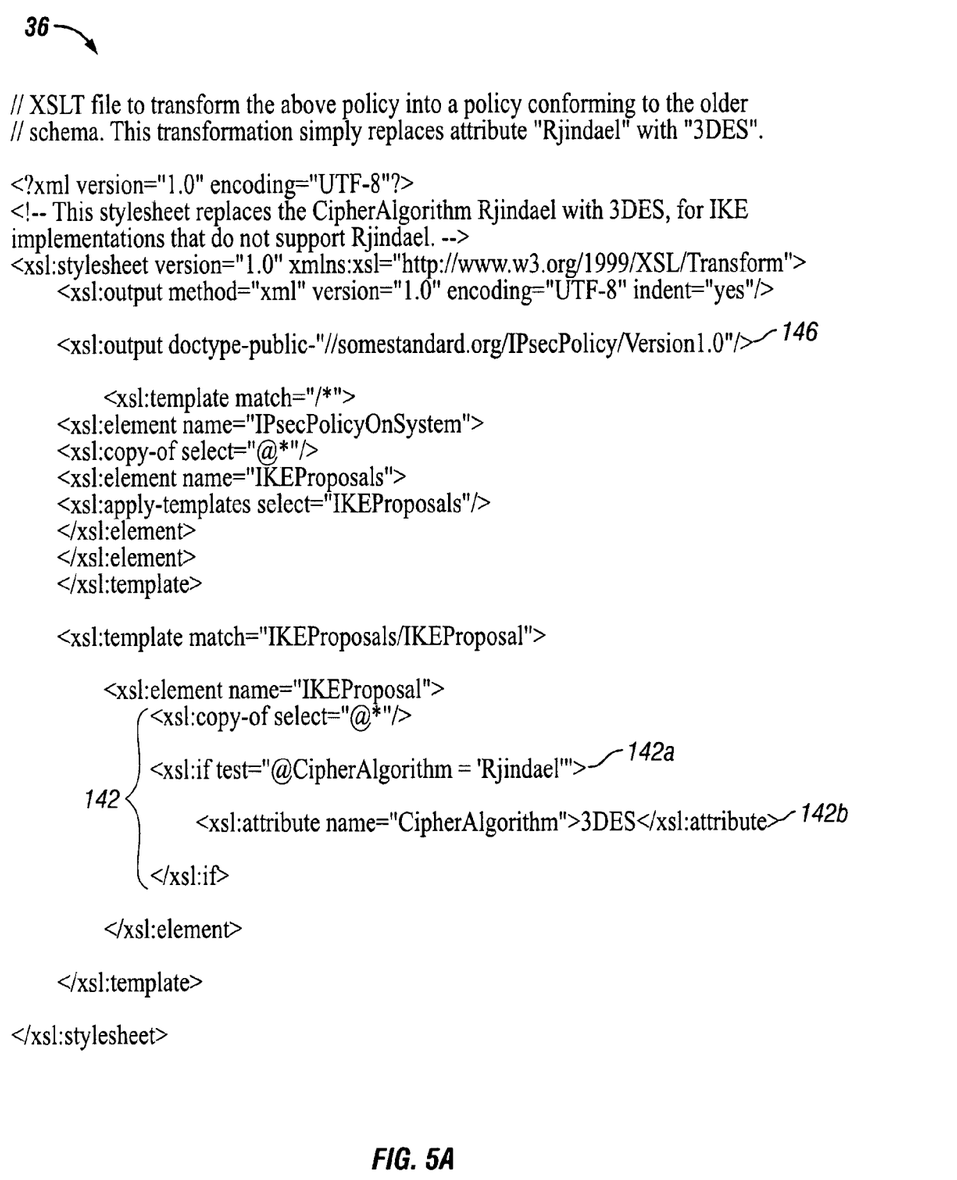
FIG. 5A shows a second part of the network policy of FIG. 2 and a translation specification.

As shown in FIG. 5A, an XSL translation specification 36 (see also FIG. 1) may be used to translate policy 30 to an older version "1.0", which conforms to the older schema 130. The specification includes a set 142 of statements that replace instances of the "Rjindael" cipher algorithm with the "3DES" algorithm, which is defined in the older schema 130. A statement 142a in the set 142 directs a policy translator to check whether a policy has "Rjindael" defined as a cipher algorithm and another statement 142b directs policy translator to change the cipher algorithm to change the cipher algorithm from "Rjindael" to "3DES." Thus the specification 36 directs a policy translator to translate a policy from version 1.1 to version 1.0. A statement 146 directs the policy translator to change the policy so that it reflects the older schema version 1.0.

Figure 5B:
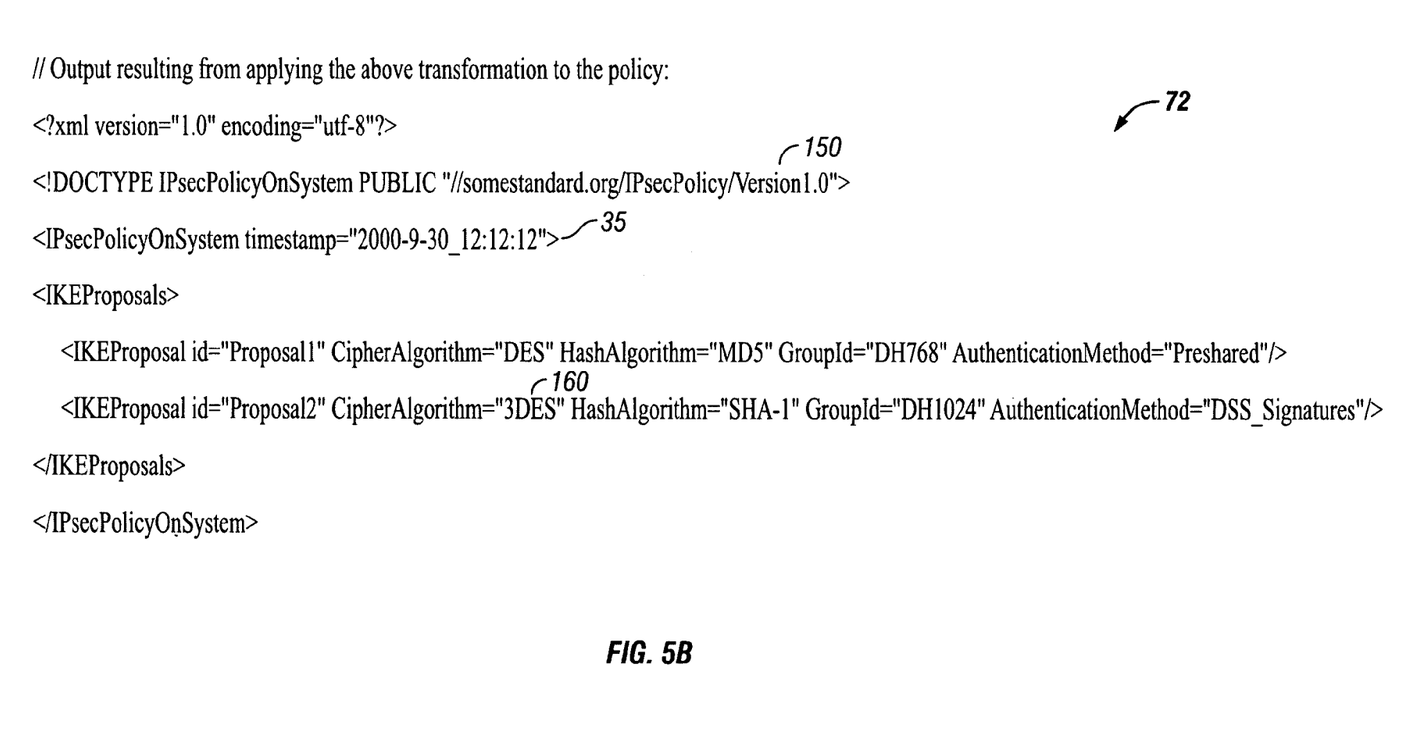
FIG. 5B shows a translated version of the network policy of FIG. 1.

FIG. 5B shows the translated policy 72 resulting from translating policy 30 (FIG. 2) based on specification 36. As shown in FIG. 5B, the version number 150 has been changed from "1.1" to "1.0" and the cipher algorithm 160 has been changed from "Rjindael" to "3DES." However, the timestamp 35 of the policy 72 has not been changed because the translation process does not affect the creation date of the policy. The translated policy 72 may be used by clients 12, 14, 16 (FIG. 1) that require a policy that conforms to the schema 130 of FIG. 4.

Figure 6:
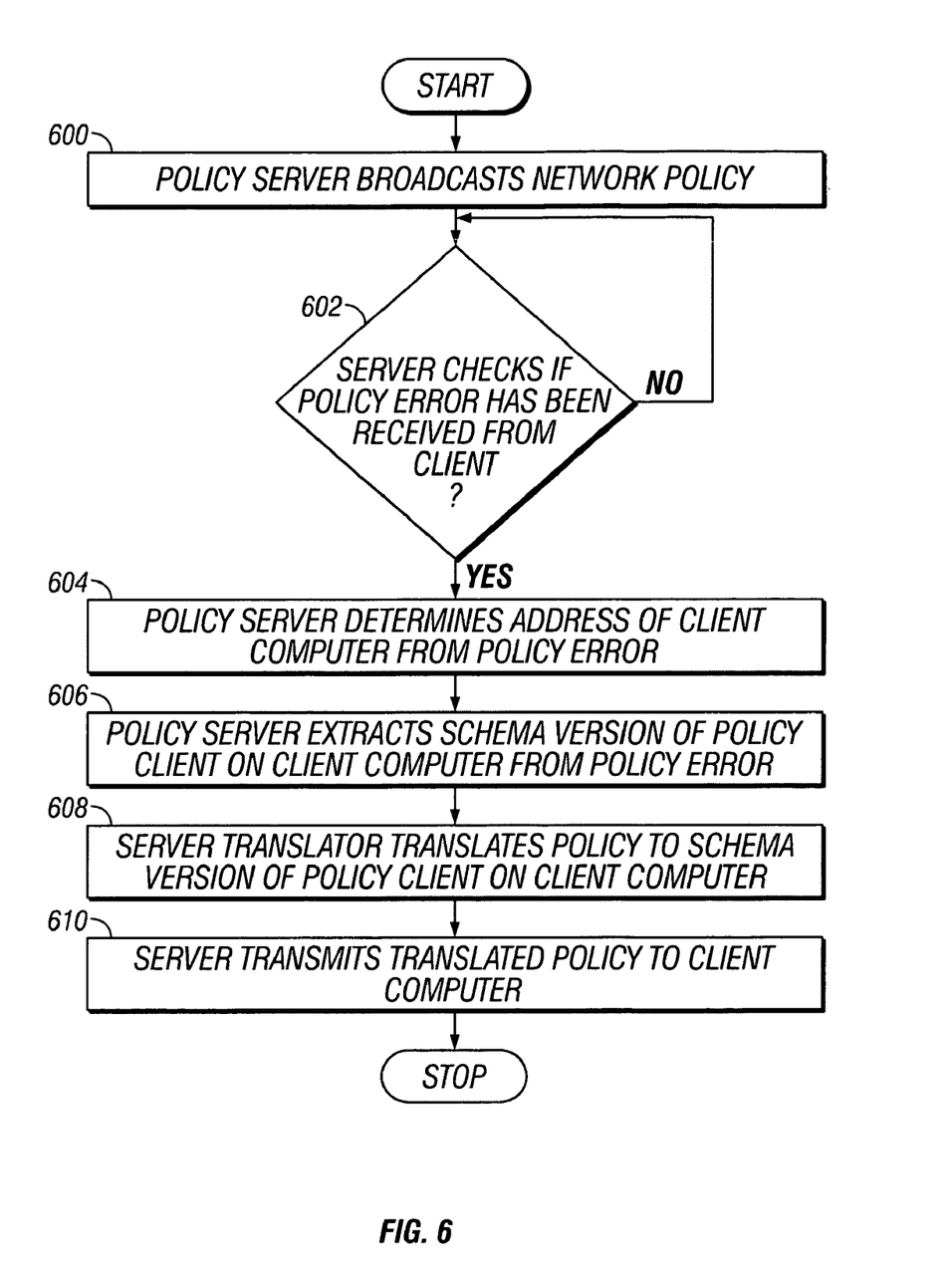
FIG. 6 is a flow chart of the process implemented by the server of FIG. 1.

As shown in FIG. 6, the server 18 begins the process of configuring the clients 12, 14, 16 by broadcasting (600) the network policy 30 on the network 10, so that the policy 30 is received by all the clients 12, 14, 16. By sending the policy 30 to the clients 12, 14, 16 in a single transmission, the server reduces the network traffic needed to configure the clients. The server 18 then checks (602) whether a policy error 71 has been received from any of the client computers 12, 14, 16. If a policy error 71 has not been received, the server 18 continues to wait for an error 71.

Otherwise the server 18 determines (604) the address of the client computer 16 that sent the policy error 71 from the information contained within the policy error. The server 18 also extracts (606) the version 64c of the schema 62c of the client from the information contained within the policy error 71. Upon extracting the version 64c, the policy translator 40 on the server 18 translates (608) the network configuration 32 of the policy 30 to the version 64c using the translation specification 36 to produce a translated policy 72. The server transmits (610) the translated policy 72 to the client computer 16 and stops the process.

Figure 7A:
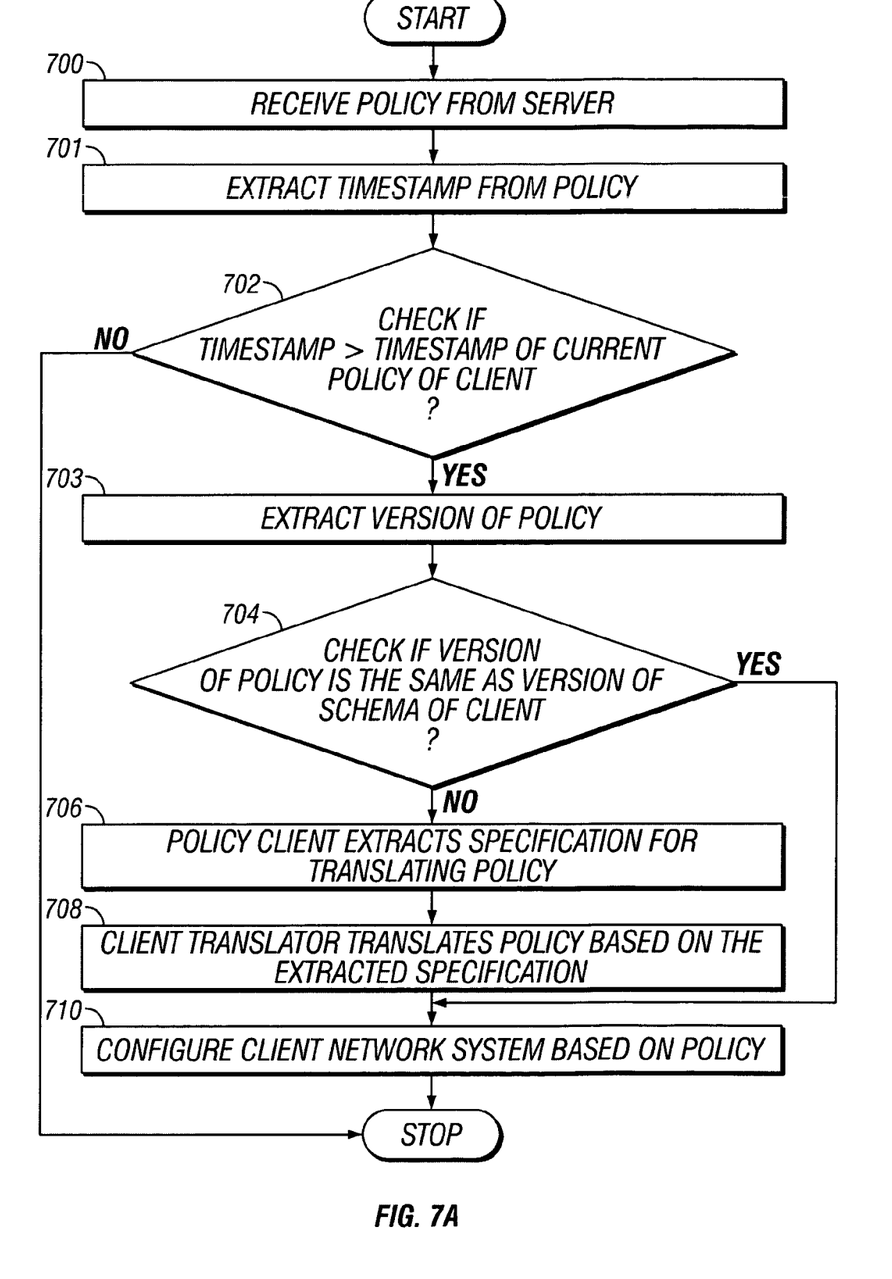
FIG. 7A is a flow chart of the process implemented by one of the clients of FIG. 1.

As shown in FIG. 7A, the process of configuring a client 12, 14 that includes a policy translator 70a, 70b begins when the client 12, 14 receives (700) a policy 30 from the server 18. The client 12, 14 extracts (701) the timestamp 35 from the policy 30 and checks (702) whether the timestamp 35 is greater than the timestamp 57a, 57b of a network policy that was previously used to configure the network systems 56a, 56b of the clients. A greater timestamp 35 indicates that the policy 30 was created more recently than the policy that was previously used to configure the network systems 56a, 56b of the clients. If the timestamp 35 is not greater, the client 12, 14, terminates the configuration process.

Otherwise, if the timestamp 35 is greater, the client 12, 14 extracts (703) a schema version 34 from the policy 30 and checks (704) if the extracted schema version 34 is the same as the version 64a, 64b associated with the client 12, 14. If the extracted schema version 34 is the same as the version 64a, 64b of the client 12, 14, the network configurator 60a, 60b of the client 12, 14 configures (710) the network system 56a, 56b of the client using the policy 30.

Otherwise, if the extracted schema version 34 is not the same as the version 64a, 64b of the client 12, 14, the policy client 58a, 58b extracts (706) the translation specification 36 from the policy 30 and translates (708) the network configuration 32 of the policy 30 using the extracted specification 36. The network configurator 60a, 60b of the client 12, 14 then configures (710) the network system 56a, 56b of the client using the translated policy.

Figure 7B:
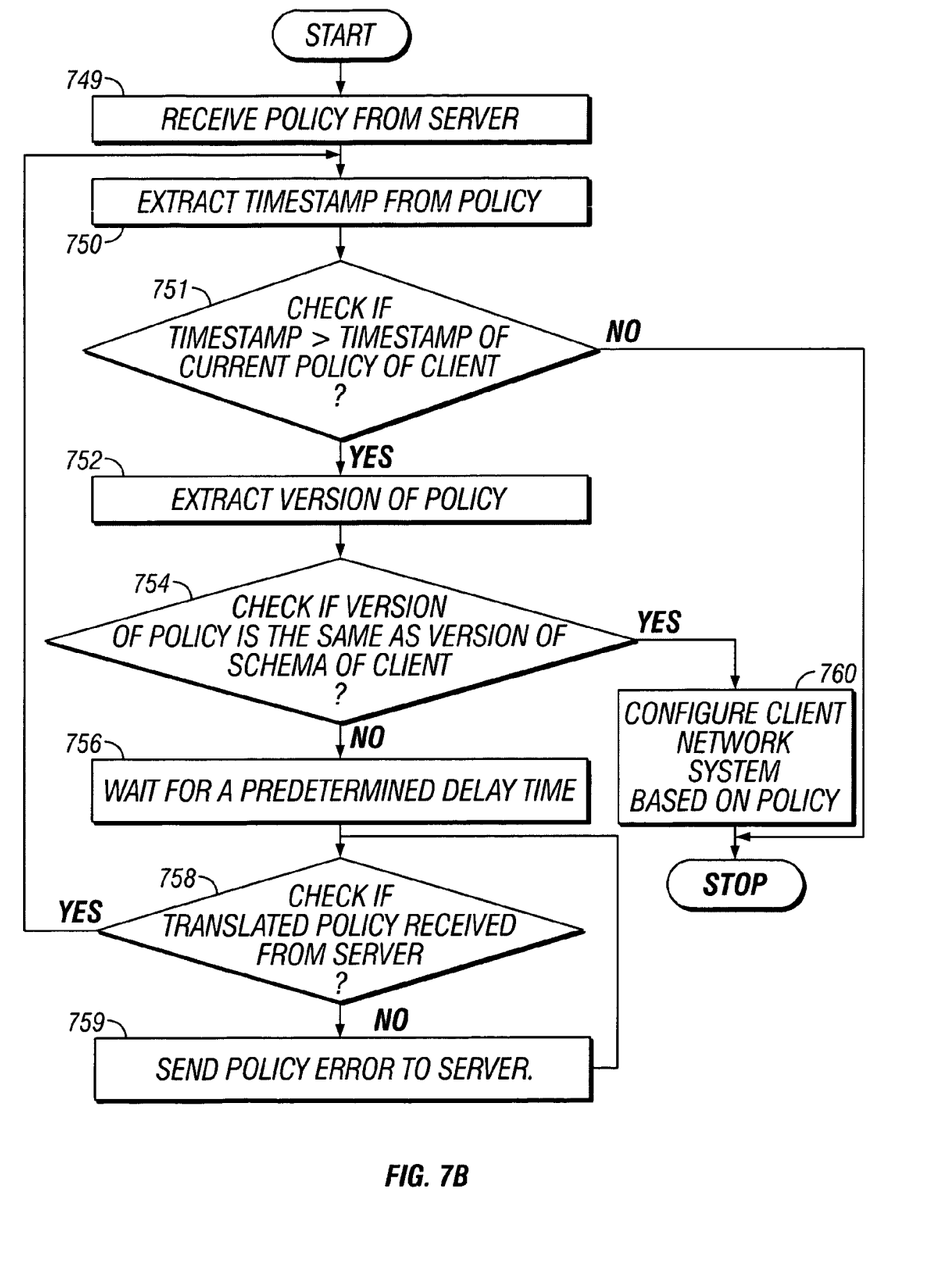
FIG. 7B is a flow chart of the process implemented by another one of the clients of FIG. 1.

As shown in FIG. 7B, the process of configuring a client 16 that does not have a policy translator also begins when the client 16 receives (749) a policy 30 from the server 18. The client extracts (750) a timestamp 35 from the policy 30, and checks (751) whether the timestamp 35 is greater than the timestamp 57c of a network policy that was previously used to configure the network systems 56c of the client 16. If the timestamp 35 is not greater, the client 16 terminates the process.

Otherwise, if the timestamp 35 is greater, the client 16 extracts (752) a schema version 34 from the policy 30 and checks (754) if the extracted schema version 34 is the same as the version 64c associated with the client 16. If the extracted schema version 34 is the same as the version 64c of the client 16, the network configurator 60c of the client 16 configures (760) the network system 56c of the client using the policy 30 and terminates the process.

Otherwise, if the extracted schema version 34 is not the same as the version 64c of the client 16, the client 16 waits (756) for a predetermined waiting period and then checks (758) whether a translated policy 72 has been received from the server 18. By waiting for the predetermined period, the client 16, can receive a translated policy that was broadcast or transmitted (610 FIG. 6) from the server to another client (not shown) which also does not have a policy translator. The different clients are configured to wait for different predetermined periods so that client computers with longer waiting periods can configure their network systems with translated policies which are sent by the server in response to policy errors from clients with shorter waiting periods. This reduces the number of policy errors and translated policies sent over the network, thereby reducing the network traffic.

If a translated policy 72 has not been received, the policy client 58c sends (759) a policy error 71 to the server 18 and then checks (758) if a translated policy has been received. Otherwise, if a translated policy 72 has been received, the client 16 extracts 750 a timestamp from the translated policy and repeats the process (751-760) described above.

Other embodiments are within the scope of the following claims. For example, the policy 30 and its translation specification 36 may not be sent in a single file. Instead, the policy and the specification may be sent in two separate files, allowing the same specification 36 to be used with two different policies 30. The server 18 may be configured to transmit the translated policy 72 to a single client 16 instead of broadcasting the translated policy 72 to multiple clients in the network 10. In such a single re-transmission network, the configuration process (FIG. 7B) for a client 16 that does not have a policy translator would not include waiting (756) for a delay time before sending (759) a policy error.

What is claimed is:

1. A method, comprising:
    receiving, in a client, a file including both a network policy and multiple translation specifications for translating the network policy from a first schema to multiple, different schemas, the file being the same file that is received by at least plural other clients within a network system;
    translating the network policy, in the client, into one of the multiple, different schemas based on one of the multiple translation specifications, the one of the multiple, different schemas being associated with the client; and
    configuring the network system based on the translated network policy.

2. The method of claim 1 wherein the network policy is represented in Markup Language which uses tags.

3. A method as in claim 1, wherein the network policy received in the client includes an indicia that represents a first version number of the network policy that is received in the file, and wherein said one of the multiple translation specifications for translating includes information for translating the network policy from said first version number to a second version number different than the first version number.

4. A method as in claim 1, wherein said one of the multiple translation specifications for translating includes information indicative of a different kind of encryption that is used and a second schema, and information about how to translate the network policy to use said different kind of encryption.

5. An article comprising a machine-readable medium which stores machine-executable instructions for checking events performed by a device, the instructions causing a machine to:
    receive, in a client, a file including both a network policy and multiple translation specifications for translating a policy from a first schema to multiple, different schemas, the file being the same file received by at least plural other clients in a network system;
    translate the network policy into one of the multiple, different schemas based on one of the multiple translation specifications, the one of the multiple, different schemas being associated with the client; and
    configure the network system based on the translated network policy.

6. The article of claim 5 wherein the network policy is represented in eXtensible Markup Language and the multiple translation specifications are represented in eXtensible Stylesheet Language.

7. An article as in claim 5, wherein the network policy includes an indicia that represents a first version number of the network policy that is received in the file, and wherein said one of the multiple translation specifications for translating includes information for translating the network policy that is received in the file from said first version number to a second version number different than the first version number.

8. An article as in claim 5, wherein said one of the multiple translation specifications for translating includes information indicative of a different kind of encryption that is used in a second schema, and information about how to translate the network policy to use said different kind of encryption, and wherein translate comprises translating the network policy including changing the kind of encryption that it uses.

9. An apparatus comprising:
    a memory which stores computer readable instructions; and
    a processor which executes the computer readable instructions to:
    receive in a client, a file including both a network policy and multiple translation specifications for translating a policy from a first schema to multiple, different schemas, the file being the same file received by at least plural other clients in a network system;
    translate the network policy into one of the multiple, different schemas based on one of the multiple translation specifications, the one of the multiple, different schemas being associated with the client; and
    configure the network system based on the translated network policy.

10. The apparatus of claim 9 wherein the network policy is represented in eXtensible Markup Language and the multiple translation specifications are represented in eXtensible Stylesheet Language.

11. An apparatus as in claim 9, wherein said processor receives in said file, the network policy that includes an indicia that represents a first version number of the network policy in the file, and said one of the multiple translation specifications, wherein said one of the multiple translation specifications includes information for translating the network policy that is received in the file from said first version number to a second version number different than the first version number.

12. An apparatus as in claim 9, wherein said one of the multiple translation specifications for translating includes information indicative of a different kind of encryption that is used in a second schema, and wherein said processor operates to translate the network policy including changing the kind of encryption that is used.

13. A method, comprising:
sending a network policy to a client computer;
said network policy being for configuring a network system according to a first schema;
sending multiple translation specifications for translating the network policy to the client computer;
said multiple translation specifications being for translating the network policy from the first schema to multiple, different schemas;
said network policy and said multiple translation specifications being sent in a file, the file being the same file received by at least plural other clients in a network system;
receiving an indication that the client computer cannot translate the network policy;
translating the network policy into one of the multiple, different schemas based on one of the multiple translation specifications in response to said receiving, the one of the multiple, different schemas being associated with the client computer; and
after said translating, sending the translated network policy to a client computer.

14. The method of claim 13 wherein the network policy is represented in eXtensible Markup Language and the multiple translation specifications are represented in eXtensible Stylesheet Language.

15. The method of claim 13 wherein the network policy and the multiple translation specifications are stored in the same file.

16. A method as in claim 13, wherein the network policy received in the client includes an indicia that represents a first version number of the network policy that is received in the file, and wherein said one of the multiple translation specifications for translating includes information for translating the network policy from said first version number to a second version number different than the first version number.

17. A method as in claim 13, wherein said one of the multiple translation specifications for translating includes information indicative of a different kind of encryption that is used and a second schema, and information about how to translate the network policy to use said different kind of encryption.

18. An article comprising a computer-readable medium which stores computer-executable instructions for checking events performed by a device, the instructions causing a machine to:
send a network policy for configuring a network system according to a first schema to plural clients in the network system, including at least a first client computer;
send multiple translation specifications for translating the network policy from the first schema to multiple different schemas to the first client computer;
said network policy and said multiple translation specifications being sent in a file, the file being the same file received by at least said plural clients in the network system;
receive an indication that the first client computer cannot translate the network policy;
translate the network policy into one of the multiple, different schemas based on one of the multiple translation specifications in response to said received indication, the one of the multiple, different schemas being associated with the first client; and
send a translated network policy to the first client computer.

19. The article of claim 18 wherein the network policy is represented in eXtensible Markup Language and the multiple translation specifications are represented in eXtensible Stylesheet Language.

20. The article of claim 18 wherein the network policy and the multiple translation specifications are stored in the same file.

21. An article as in claim 18, wherein the network policy includes an indicia that represents a first version number of the network policy that is received in the file, and wherein said one of the multiple translation specifications for translating includes information for translating the network policy that is received in the file from said first version number to a second version number different than the first version number.

22. An article as in claim 18, wherein said one of the multiple translation specifications for translating includes information indicative of a different kind of encryption that is used in a second schema, and information about how to translate the network policy to use said different kind of encryption, and wherein translate comprises translating the network policy including changing the kind of encryption that it uses.

23. An apparatus comprising:
a memory which stores computer readable instructions;
a processor which executes the computer readable instructions to:
send a network policy for configuring a network system according to a first schema to a client computer;
send multiple translation specifications for translating the network policy from the first schema to multiple, different schemas to the client computer;
said network policy and said multiple translation specifications being sent in a file, the file being the same file received by all clients in a network;
receive an indication that the client computer cannot translate the network policy;
translate the network policy into one of the multiple, different schemas based on one of the multiple translation specifications, the one of the multiple, different schemas being associated with the client computer; and
send a translated network policy to the client computer.

24. The apparatus of claim 23 wherein the network policy is represented in eXtensible Markup Language and the multiple translation specifications are represented in eXtensible Stylesheet Language.

25. The apparatus of claim 23 wherein the network policy and the multiple translation specifications are stored in one file.

26. An apparatus as in claim 23, wherein said processor receives in said file, the network policy that includes an indicia that represents a first version number of the network policy in the file, and said one of the multiple translation specifications, wherein said one of the multiple translation specifications includes information for translating the network policy that is received in the file from said first version number to a second version number different than the first version number.

27. An apparatus as in claim 23, wherein said one of the multiple translation specifications for translating includes information indicative of a different kind of encryption that is used in a second schema, and wherein said processor operates to translate the network policy including changing the kind of encryption that is used.

28. A method of configuring a network comprising:

transmitting a file that includes both network policy according to a first schema and multiple translation specifications for translating the network policy from the first schema to multiple, different schemas from a server, said transmitting comprising transmitting the file to all clients in a network;

receiving the network policy and the multiple translation specifications on a first client computer;

translating on the first client computer the network policy from the first schema to one of the multiple, different schemas using one of the multiple translation specifications, the one of the multiple, different schemas being associated with the first client computer; and configuring the network system on the first client computer using on the translated network policy.

29. The method of claim 28 further comprising:

receiving the network policy on a second client computer; and configuring the network system on the second client computer using the network policy.

30. The method of claim 28 further comprising:

receiving the network policy on a third client computer;

transmitting to the server an indication that the third client computer cannot translate the network policy;

translating on the server the network policy from the first schema to one of the multiple, different schema using one of the multiple translation specifications, the one of the multiple, different schemas being associated with the third client computer; and transmitting the translated network policy to the third client computer.

31. The method of claim 30 wherein the network policy is represented in eXtensible Markup Language and the multiple translation specifications are represented in eXtensible Stylesheet Language.

32. A method as in claim 28, wherein the network policy received in the client includes an indicia that represents a first version number of the network policy that is received in the file, and wherein said one of the multiple translation specifications for translating includes information for translating the network policy from said first version number to a second version number different than the first version number.

33. A method as in claim 28, wherein said one of the multiple translation specifications for translating includes information indicative of a different kind of encryption that is used and a second schema, and information about how to translate the network policy to use said different kind of encryption.

* * * * *